United States Patent [19]
Oh

[11] Patent Number: 5,574,349
[45] Date of Patent: Nov. 12, 1996

[54] SERVO MOTOR CONTROL CIRCUIT

[75] Inventor: Yong G. Oh, Seoul, Rep. of Korea

[73] Assignee: Goldstar Co., Ltd., Seoul, Rep. of Korea

[21] Appl. No.: 367,805

[22] Filed: Dec. 30, 1994

[30] Foreign Application Priority Data

Dec. 31, 1993 [KR] Rep. of Korea .................. 1993-32127

[51] Int. Cl.$^6$ ...................................... G05B 1/02
[52] U.S. Cl. ........................ 318/606; 318/608; 318/601
[58] Field of Search .................... 318/606, 811, 318/254, 138, 600, 601, 608, 602

[56] References Cited

U.S. PATENT DOCUMENTS

| | | | |
|---|---|---|---|
| 4,243,921 | 1/1981 | Tamura et al. | |
| 4,353,016 | 10/1982 | Born | 318/254 |
| 4,567,409 | 1/1986 | Ogawa | 388/821 |
| 5,023,924 | 6/1991 | Tajima et al. | 318/811 |
| 5,303,093 | 4/1994 | Kawasaki | 360/30 |
| 5,304,908 | 4/1994 | Oh . | |
| 5,321,342 | 6/1994 | Kruse | 318/138 |

*Primary Examiner*—John W. Cabeca
*Attorney, Agent, or Firm*—Fliesler, Dubb, Meyer & Lovejoy

[57] ABSTRACT

A servo motor control circuit for a video signal playback apparatus including a wave-shaping circuit, a speed error detector, a first filtering circuit for filtering torque ripple components of servo motor speed error signals characterized in that the gain in much higher in a low frequency band than in any other frequency band, a second filtering circuit for attenuating the low frequency gain of signals output from the first filtering circuit, a phase error detector, an adder, and a motor controller, resulting in a decrease in low frequency band phase distortion and a decrease in the time required for servo motor stabilization.

2 Claims, 7 Drawing Sheets

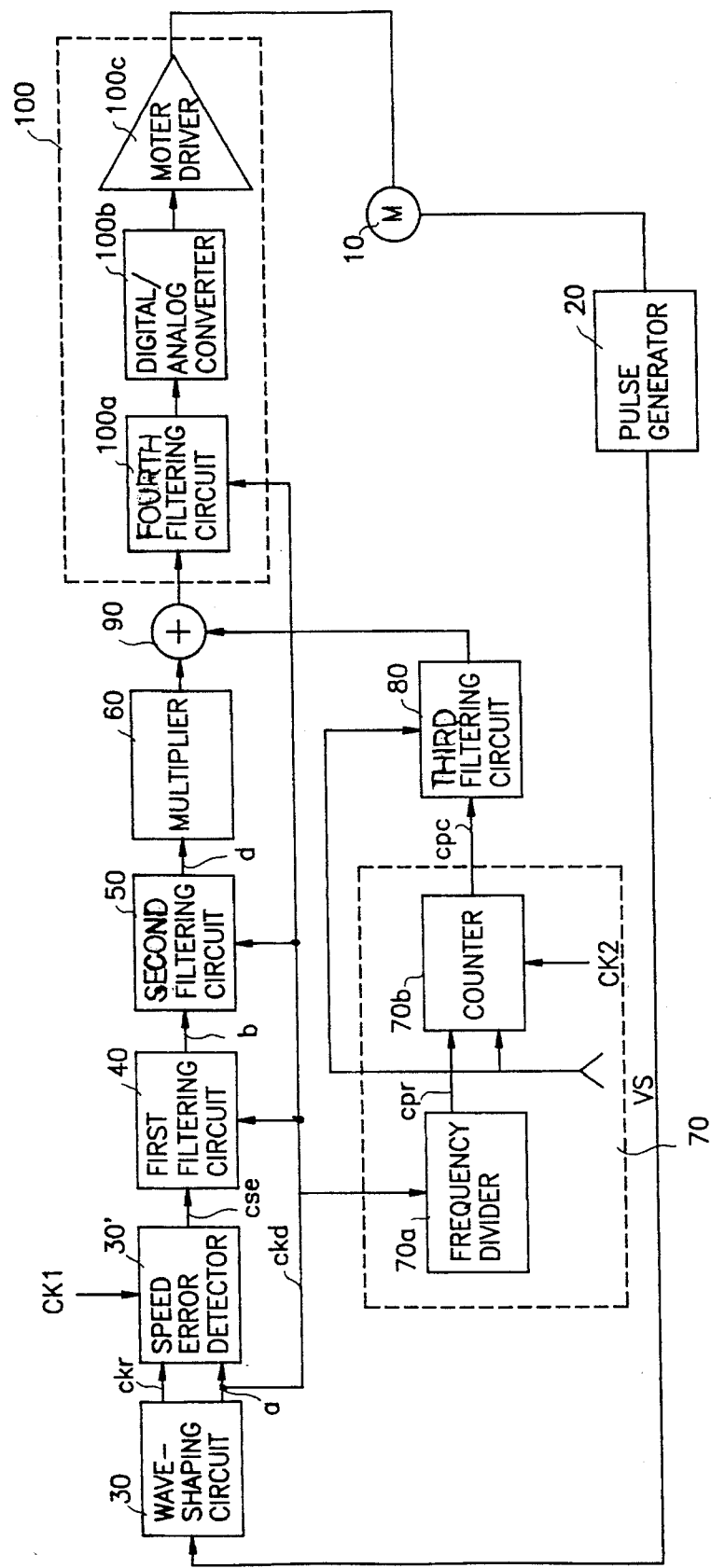

5,574,349

1

SERVO MOTOR CONTROL CIRCUIT

BACKGROUND OF THE INVENTION

1. Field of the Invention

The present invention relates in general to a servo motor control circuit for a servo system of a video signal recording/playback apparatus, and more particularly to a servo motor control circuit for attenuating a gain of a transfer signal increased at a low-frequency region using a low-frequency gain attenuation filter to control a servo motor.

2. Description of the Prior Art

Referring to FIG. 1, there is shown a block diagram of a conventional servo motor control circuit. As shown in this drawing, the conventional servo motor control circuit comprises a pulse generator 2 for generating a pulse signal according to a rotation of a servo motor M 1, a wave-shaping circuit 3 for wave-shaping an output signal a from the pulse generator 2 and outputting the resultant two signals b and c, a speed error detector 3' for inputting the output signals c and b from the wave-shaping circuit 3 as reset and enable signals, respectively, and counting an external clock signal CK1 in response to the inputted signals to output a speed error signal e, a first filtering circuit 4 for filtering a torque ripple component of the speed error signal e from the speed error detector 3' in response to the output signal b from the wave-shaping circuit 3, and a multiplier 5 for multiplying an output signal n from the first filtering circuit 4 by a desired number. The output signals b and c from the wave-shaping circuit 3 are generated out of phase with each other.

The conventional servo motor control circuit also comprises a phase error detector 6 for counting an external clock signal CK2 in response to the output signal b from the wave-shaping circuit 3 to output a phase error signal i in response to an external vertical synchronous signal h, a second filtering circuit 7 for filtering the phase error signal i from the phase error detector 6 at a desired frequency band in response to the vertical synchronous signal h, a speed/phase adder 8 for adding an output signal from the multiplier 5 and an output signal from the second filtering circuit 7, and a motor controller 9 for controlling the servo motor 1 in response to an output signal from the speed/phase adder 8 and the output signal b from the wave-shaping circuit 3.

Referring to FIG. 2, there is shown a detailed block diagram of the first filtering circuit 4. As shown in this drawing, the first filtering circuit 4 includes a first adder 4a for adding the speed error signal e from the speed error detector 3' and a delayed signal Z, an adding range limiter 4b for limiting a desired range of an output signal from the first adder 4a, a first delay 4c for delaying an output signal from the adding range limiter 4b for a predetermined time period in response to the output signal b from the wave-shaping circuit 3; a second delay 4d for delaying an output signal from the first delay 4c for the predetermined time period in response to the output signal b from the wave-shaping circuit 3 and outputting the delayed signal Z to the first adder 4a, a multiplier 4e for multiplying the output signal from the first delay 4c by a desired number, and a second adder 4f for adding an output signal m from the multiplier 4e and the speed error signal e from the speed error detector 3'.

Referring again to FIG. 1, the phase error detector 6 includes a frequency divider 6a for frequency-dividing the output signal b from the wave-shaping circuit 3 at a desired ratio, and a counter 6b being reset in response to an output signal f from the frequency divider 6a to count the clock

2 signal CK2 and output the resultant signal as the phase error signal i in response to the vertical synchronous signal h.

The motor controller 9 includes a third filtering circuit 9a for filtering the output signal from the speed/phase adder 8 at a desired frequency band in response to the output signal b from the wave-shaping circuit 3, a digital/analog converter 9b for converting a digital signal from the third filtering circuit 9a into an analog signal, and a motor driver 9c for driving the servo motor 1 in response to an output signal from the digital/analog converter 9b.

The operation of the conventional servo motor control circuit with the above-mentioned construction will hereinafter be described with reference to FIGS. 3A to 5. FIGS. 3A to 3N are waveform diagrams of the signals from the components in FIGS. 1 and 2, FIG. 4 is a graph illustrating a signal transfer characteristic in FIG. 2, and FIG. 5 is a graph illustrating a signal gain characteristic in FIG. 1.

First, as the servo motor M 1 is rotated, the pulse generator 2 generates a sinusoidal wave pulse signal a as shown in FIG. 3A and outputs the generated sinusoidal wave pulse signal a to the wave-shaping circuit 3. Upon receiving the sinusoidal wave pulse signal a from the pulse generator 2, the wave-shaping circuit 3 wave-shapes the received sinusoidal wave pulse signal a and outputs the resultant square wave pulse signals b and c as shown in FIGS. 3B and 3C to the speed error detector 3'. The square wave pulse signal b from the wave-shaping circuit 3 is also applied to the first and second delays 4c and 4d in the first filtering circuit 4, the frequency divider 6a in the phase error detector 6 and the third filtering circuit 9a in the motor controller 9.

The speed error detector 3' is reset in response to the square wave pulse signal c from the wave-shaping circuit 3 and enabled in response to the square wave pulse signal b from the wave-shaping circuit 3. As a result, the speed error detector 3' counts the clock signal CK1, as shown in FIG. 3D, and outputs the resultant speed error signal e as shown in FIG. 5E.

The speed error signal e from the speed error detector 3' is applied to the first and second adders 4a and 4f in the first filtering circuit 4.

Then in the first filtering circuit 4, the first adder 4a adds the speed error signal e from the speed error detector 3' and the delayed signal Z from the second delay 4d and outputs the resultant signal to the adding range limiter 4b. The adding range limiter 4b limits the desired range of the output signal from the first adder 4a and outputs the resultant signal to the first delay 4c.

The first delay 4c shifts the output signal from the adding range limiter 4b for the predetermined time period in response to the output signal b from the wave-shaping circuit 3 and outputs the resultant signal to the second delay 4b and the multiplier 4e.

Upon receiving the output signal from the first delay 4c, the second delay 4d shifts the received signal for the predetermined time period in response to the output signal b from the wave-shaping circuit 3 and outputs the resultant signal Z to the first adder 4a.

Thereafter, the first adder 4a, the adding range limiter 4b and the first and second delays 4c and 4d perform repeatedly the above sequential operation.

On the other hand, the multiplier 4e multiplies the output signal from the first delay 4c by the desired number K and outputs the resultant pulse signal m as shown in FIG. 3M to the second adder 4f. The second adder 4f adds the output signal m from the multiplier 4e and the speed error signal e from the speed error detector 3' and outputs the resultant signal n as shown in FIG. 3N to the multiplier 5.

Noticeably, the first filtering circuit 4 acts to remove the torque ripple component generated in the rotation of the servo motor 1. In the signal transfer characteristic of the first filtering circuit 4, as shown in FIG. 4, a gain of the output signal n is infinite at a low frequency band.

Here, a Z-transform value of the adding range limiter 4b is $Z^{-M}$, a Z-transform value of the first delay 4c is $Z^d$ and a Z-transform value of the second delay 4d is $Z^{-d}$. As a result, a transfer function $T_f$ of the first filtering circuit 4 can be expressed by the following equation (1):

$$T_f=1+[(Z^{-M} \cdot Z^d \cdot K)/(1-Z^{-M})] \quad (1)$$

FIG. 3K shows a waveform of the speed error signal which is again applied from the speed error detector 3' to the first filtering circuit 4 after the above filtering operation is performed by the first filtering circuit 4.

Then, upon receiving the output signal n from the second adder 4f in the first filtering circuit 4, the multiplier 5 multiplies the received signal n by the desired number and outputs the resultant signal to the speed/phase adder 8.

On the other hand, in the phase error detector 6, the frequency divider 6a frequency-divides the output signal b from the wave-shaping circuit 3 by 10 and outputs the resultant signal f as shown in FIG. 3F to the counter 6b. The counter 6b is reset in response to the output signal f from the frequency divider 6a, so as to count the clock signal CK2, as shown in FIG. 3G.

Upon receiving the vertical synchronous signal h as shown in FIG. 3H in the counting operation, the counter 6b outputs the phase error signal i as shown in FIG. 3I to the second filtering circuit 7.

The second filtering circuit 7 filters the phase error signal i from the counter 6b in the phase error detector 6 at the desired frequency band in response to the vertical synchronous signal h and outputs the resultant signal to the speed/phase adder 8.

Then, the speed/phase adder 8 adds a speed value or the output signal from the multiplier 5 and a phase value or the output signal from the second filtering circuit 7 and outputs the resultant value to the motor controller 9.

As seen from FIG. 5, a phase system gain PC or a gain of the output signal from the second filtering circuit 7 is not obtained as indicated by an ideal gain curve c but as indicated by a curve d. The sum AFPC of the phase system gain and a speed system gain or the sum of the gain of the output signal from the second filtering circuit 7 and a gain of the output signal from the multiplier 5 is not obtained as indicated by an ideal gain curve b but as indicated by a curve a.

Then in the motor controller 9, the third filtering circuit 9a filters the output signal from the speed/phase adder 8 at the desired frequency band in response to the output signal b from the wave-shaping circuit 3 and outputs the resultant digital signal to the digital/analog converter 9b. The digital/analog converter 9b converts the digital signal from the third filtering circuit 9a into the analog signal and outputs the converted analog signal to the motor driver 9c.

As a result, the motor driver 9c drives the servo motor 1 in response to the output signal from the digital/analog converter 9b.

However, the above-mentioned conventional servo motor control circuit has a disadvantage in that the phase system gain is reduced at the low frequency band because the gain of the output signal from the torque ripple removing filter is infinite at the low frequency band, resulting in a phase distortion at the low frequency band and a bad effect on a phase stabilization time. Namely, as the low-frequency speed system gain is increased, the sum of the phase system gain and the speed system gain is increased, whereas the low-frequency phase system gain is reduced. For this reason, the phase stabilization time is lengthened and the phase distortion is caused at the low frequency band.

SUMMARY OF THE INVENTION

Therefore, the present invention has been made in view of the above problem, and it is an object of the present invention to provide a servo motor control circuit for attenuating a gain of a transfer signal of a torque ripple removing filter increased at a low-frequency region using a low-frequency gain attenuation filter to control a servo motor.

In accordance with the present invention, the above and other objects can be accomplished by a provision of a servo motor control circuit for a video signal playback apparatus, comprising wave-shaping means for wave-shaping a pulse signal generated with a rotation of a servo motor and providing the resultant first and second output signals, said first and second output signals having a desired phase difference therebetween; speed error detection means for inputting the first and second output signals from said wave-shaping means as reset and enable signals, respectively, and counting an external clock signal in response to the inputted signals to output a speed error signal; first filtering means for filtering a torque-ripple component of the speed error signal from said speed error detection means in response to the second output signal from said wave-shaping means; second filtering means for attenuating a low-frequency gain of an output signal from said first filtering means in response to the second output signal from said wave-shaping means; phase error detection means for outputting a phase error signal in response to the second output signal from said wave-shaping means and an external comparison signal; speed/phase adding means for adding an output signal from said second filtering means and the phase error signal from said phase error detection means; and motor control means for controlling said servo motor in response to an output signal from said speed/phase adding means and the second output signal from said wave-shaping means.

BRIEF DESCRIPTION OF THE DRAWINGS

The above and other objects, features and advantages of the present invention will be more clearly understood from the following detailed description taken in conjunction with the accompanying drawings, in which:

FIG. 6 is a block diagram of a servo motor control circuit in accordance with the present invention;

DETAILED DESCRIPTION OF THE PREFERRED EMBODIMENTS

Figure 1:
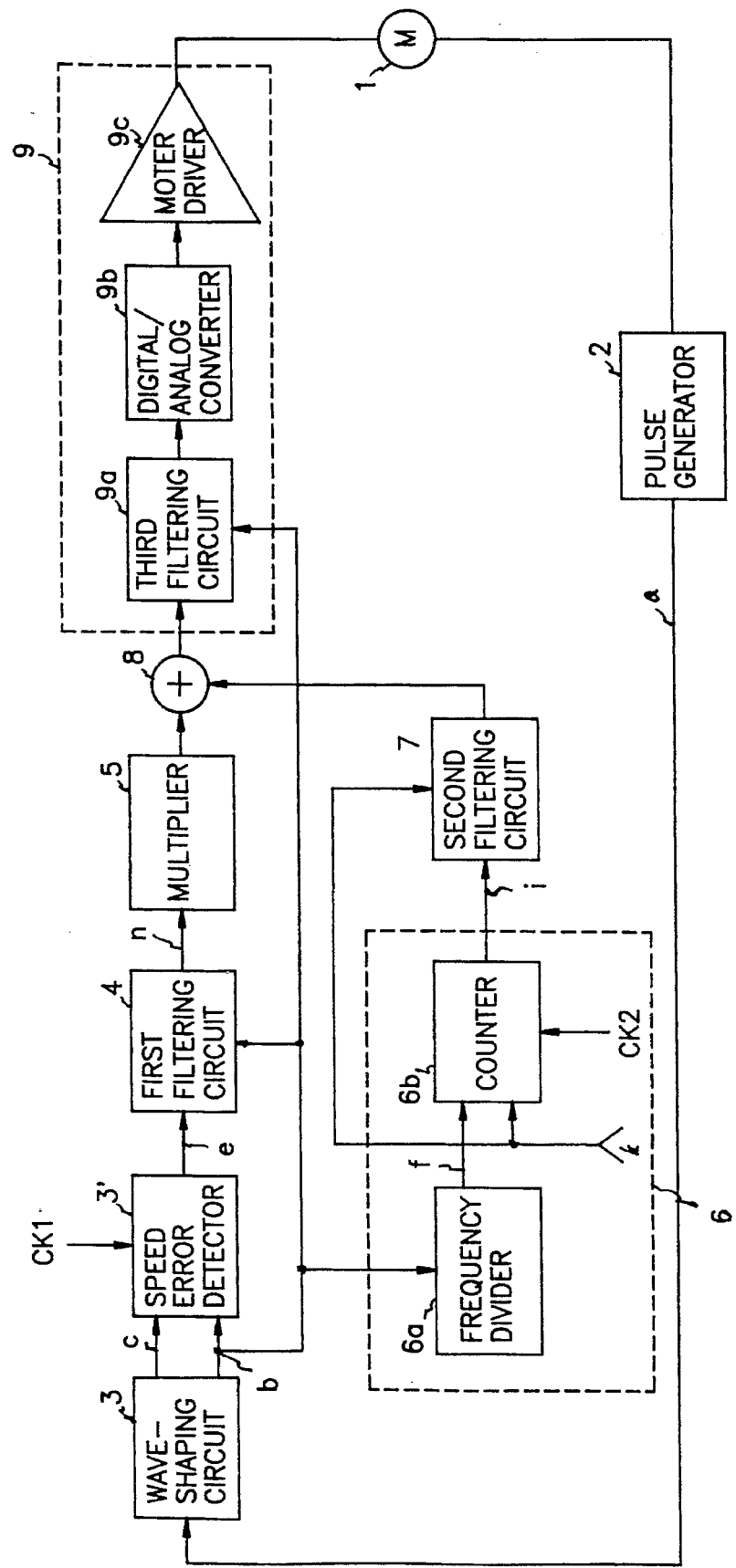
FIG. 1 is a block diagram of a conventional servo motor control circuit.
Figure 2:
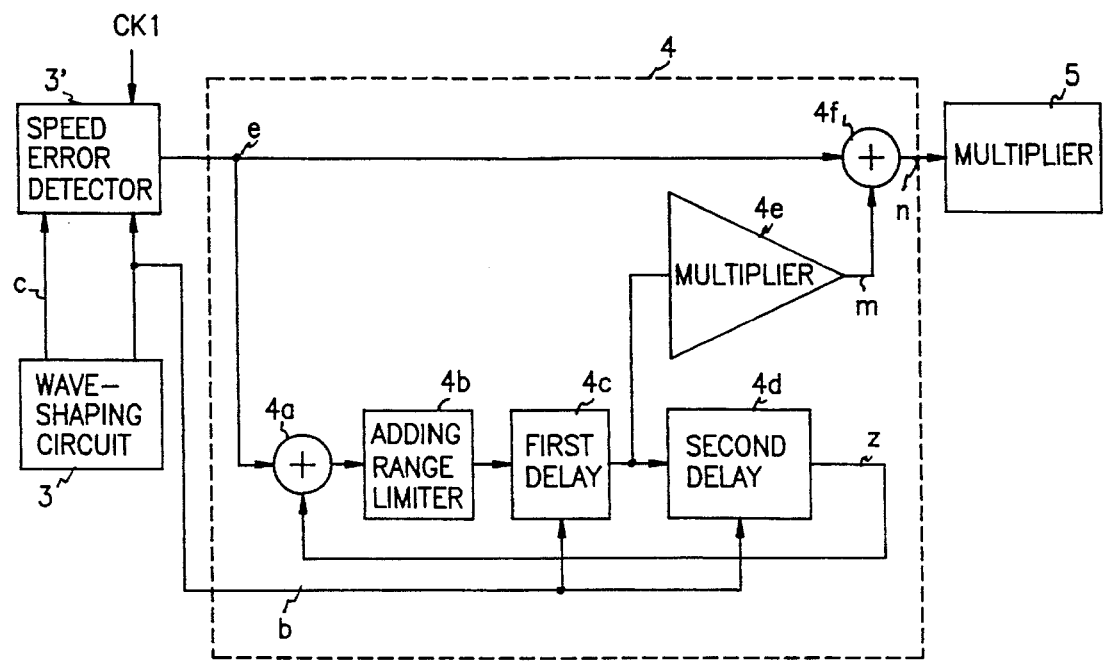
FIG. 2 is a detailed block diagram of a first filtering circuit in FIG. 1.
Figure 4:
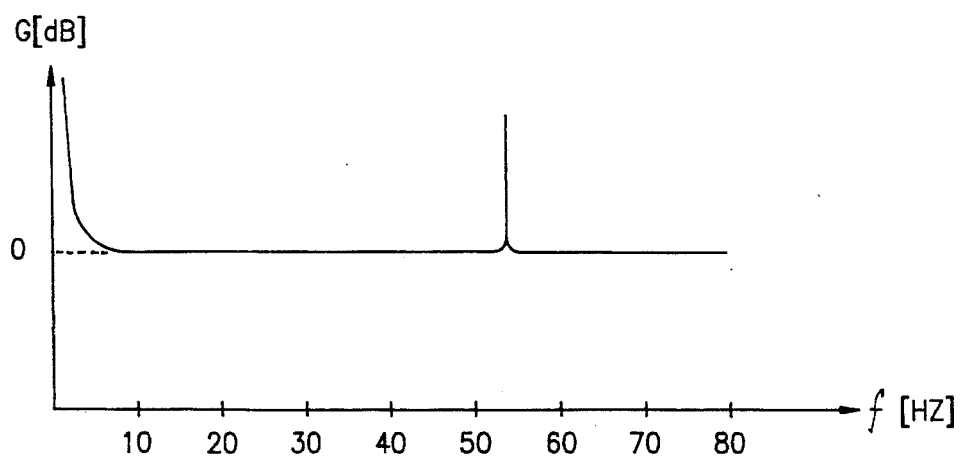
FIG. 4 is a graph illustrating a signal transfer characteristic in FIG. 2.
Figure 3:
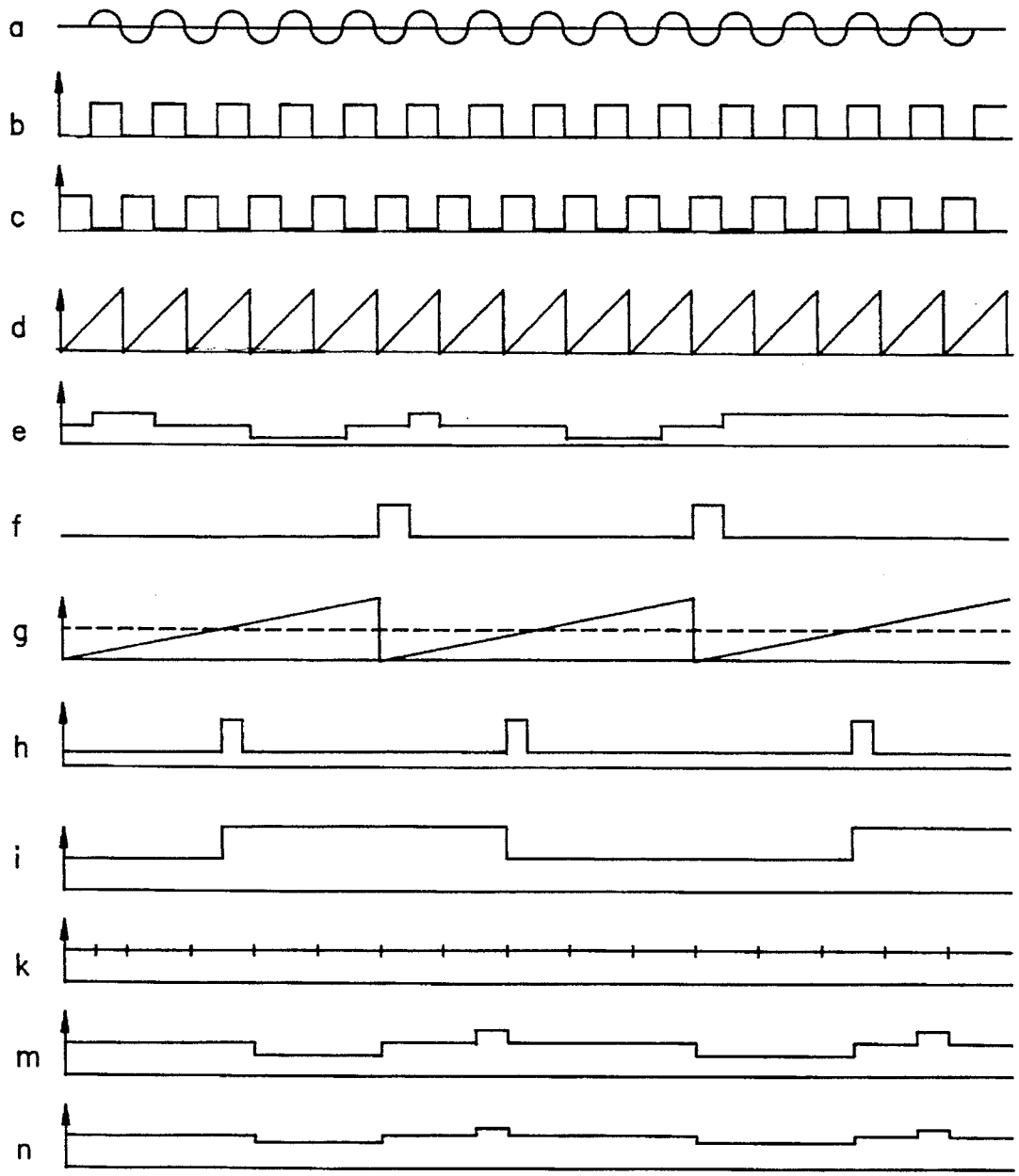
FIGS. 3A to 3N are waveform diagrams of signals from components in FIGS. 1 and 2.
Figure 5:
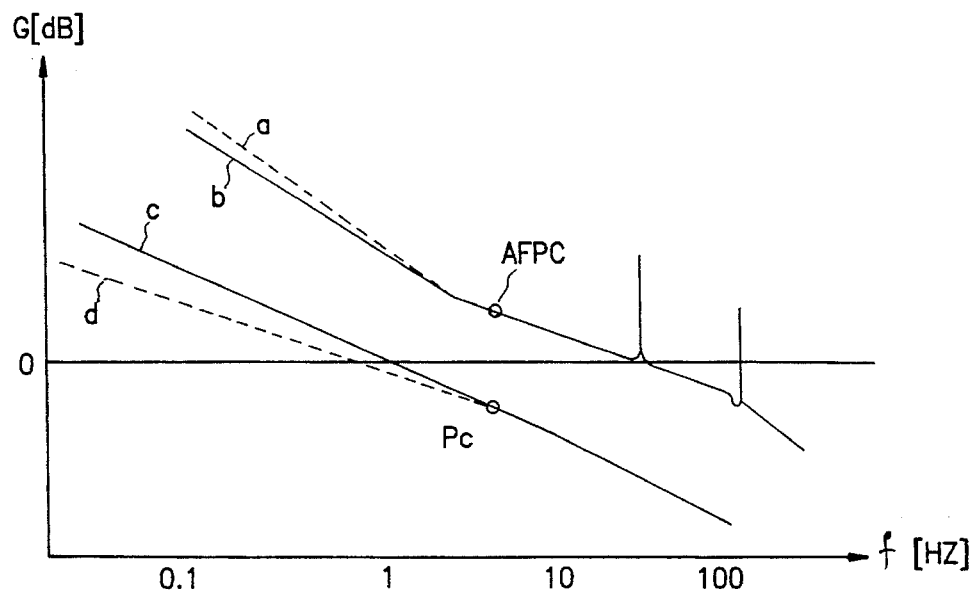
FIG. 5 is a graph illustrating a signal gain characteristic in FIG. 1.

Referring to FIG. 6, there is shown a block diagram of a servo motor control circuit in accordance with the present invention. As shown in this drawing, the servo motor control circuit comprises a pulse generator 20 for generating a pulse signal according to a rotation of a servo motor M 10, a wave-shaping circuit 30 for wave-shaping an output signal from the pulse generator 20 and outputting the resultant two signals a and ckr, a speed error detector 30' for inputting the output signals ckr and a from the wave-shaping circuit 30 as reset and enable signals, respectively, and counting an external clock signal CK1 in response to the inputted signals to output a speed error signal cse, and a first filtering circuit 40 for filtering a torque ripple component of the speed error signal cse from the speed error detector 30' in response to the output signal a from the wave-shaping circuit 30. The output signals a and ckr from the wave-shaping circuit 30 are generated out of phase with each other.

The servo motor control circuit also comprises a second filtering circuit 50 for attenuating a low-frequency gain of an output signal b from the first filtering circuit 40 in response to the output signal a from the wave-shaping circuit 30, a multiplier 60 for multiplying an output signal d from the second filtering circuit 50 by a desired number, a phase error detector 70 for counting an external clock signal CK2 in response to the output signal a from the wave-shaping circuit 30 to output a phase error signal cpe in response to an external vertical synchronous signal VS, a third filtering circuit 80 for filtering the phase error signal cpe from the phase error detector 70 at a desired frequency band in response to the vertical synchronous signal VS, a speed/phase adder 90 for adding an output signal from the multiplier 60 and an output signal from the third filtering circuit 80, and a motor controller 100 for controlling the servo motor 10 in response to an output signal from the speed/phase adder 90 and the output signal a from the wave-shaping circuit 30.

The phase error detector 70 includes a frequency divider 70a for frequency-dividing the output signal a from the wave-shaping circuit 30 at a desired ratio, and a counter 70b being reset in response to an output signal cpr from the frequency divider 70a to count the clock signal CK2 and output the resultant signal as the phase error signal cpe in response to the vertical synchronous signal VS.

Figure 7:
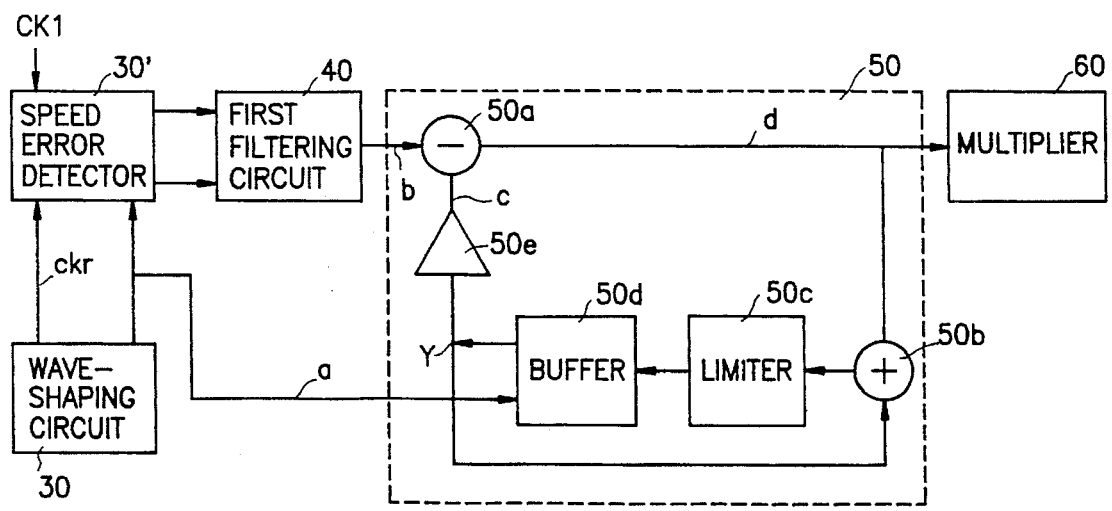
FIG. 7 is a detailed block diagram of a second filtering circuit in FIG. 6.

Referring to FIG. 7, there is shown a detailed block diagram of the second filtering circuit 50. As shown in this drawing, the second filtering circuit 50 includes a subtracter 50a for subtracting a first signal c from the output signal b from the first filtering circuit 40 and outputting the resultant signal d to the multiplier 60, an adder 50b for adding the output signal d from the subtracter 50a and a second signal Y, a limiter 50c for limiting a desired range of an output signal from the adder 50b, a buffer 50d for storing an output signal from the limiter 50c in response to the output signal a from the wave-shaping circuit 30 and outputting the stored signal as the second signal Y to the adder 50b, and a multiplier 50e for multiplying the second signal Y from the buffer 50d by a desired number and outputting the resultant signal as the first signal c to the subtracter 50a.

Referring again to FIG. 6, the motor controller 100 includes a fourth filtering circuit 100a for filtering the output signal from the speed/phase adder 90 at a desired frequency band in response to the output signal a from the wave-shaping circuit 30, a digital/analog converter 100b for converting a digital signal from the fourth filtering circuit 100a into an analog signal, and a motor driver 100c for driving the servo motor 10 in response to an output signal from the digital/analog converter 100b.

Figure 8:
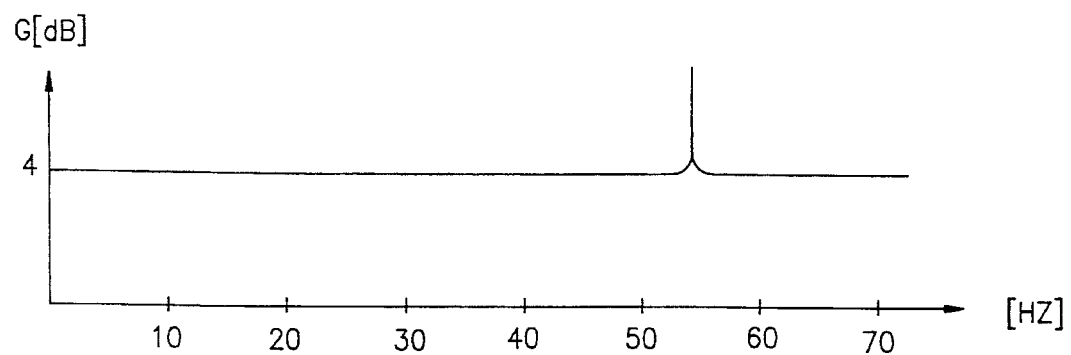
FIG. 8 is a graph illustrating a signal transfer characteristic in FIG. 7.
Figure 9:
FIGS. 9A to 9D are waveform diagrams of signals from components in FIGS. 6 and 7.
Figure 9:
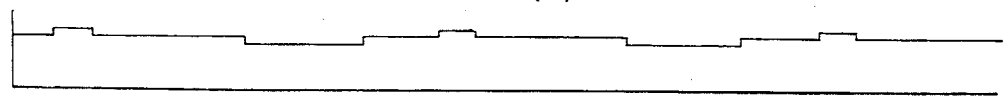
Figure 9:
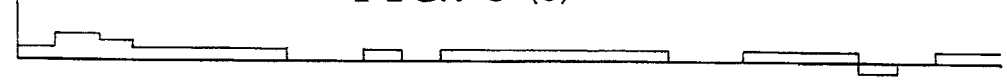
Figure 9:
Figure 10:
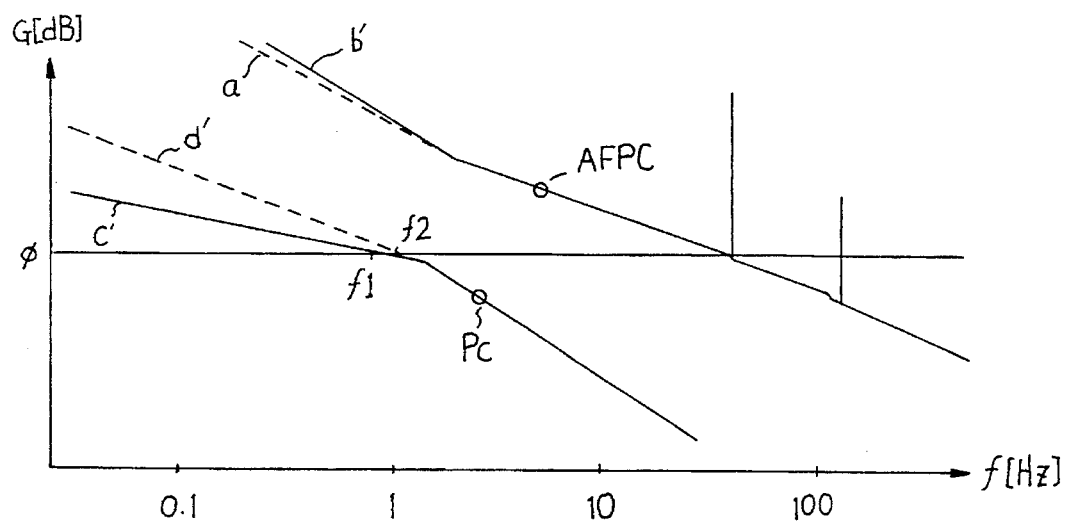
FIG. 10 is a graph illustrating a signal gain characteristic in FIG. 6.

The operation of the servo motor control circuit with the above-mentioned construction in accordance with the present invention will hereinafter be described in detail with reference to FIGS. 8 to 10. FIG. 8 is a graph illustrating a signal transfer characteristic in FIG. 7, FIGS. 9A to 9D are waveform diagrams of the signals from the components in FIGS. 6 and 7, and FIG. 10 is a graph illustrating a signal gain characteristic in FIG. 6.

First, as the servo motor M 10 is rotated, the pulse generator 20 generates a sinusoidal wave pulse signal and outputs the generated sinusoidal wave pulse signal to the wave-shaping circuit 30. Upon receiving the sinusoidal wave pulse signal from the pulse generator 20, the wave-shaping circuit 30 wave-shapes the received pulse signal and outputs the resultant square wave pulse signals a and ckr to the speed error detector 30'. The square wave pulse signal a from the wave-shaping circuit 30 is generated as shown in FIG. 9A and, although not shown, the pulse signal ckr from the wave-shaping circuit 30 is generated out of phase with the pulse signal a. The square wave pulse signal a from the wave-shaping circuit 30 is also applied to the first filtering circuit 40, the frequency divider 70a in the phase error detector 70, the buffer 50d in the second filtering circuit 50 and the fourth filtering circuit 100a in the motor controller 100.

The speed error detector 30' is reset in response to the square wave pulse signal ckr from the wave-shaping circuit 30 and enabled in response to the square wave pulse signal a from the wave-shaping circuit 30. As a result, the speed error detector 30' counts the clock signal CK1 and outputs the resultant speed error signal cse to the first filtering circuit 40.

Upon receiving the speed error signal cse from the speed error detector 30', the first filtering circuit 40 filters the torque ripple component of the received speed error signal cse in response to the output signal a from the wave-shaping circuit 30 and outputs the resultant signal b as shown in FIG. 9B to the second filtering circuit 50.

Then in the second filtering circuit 50, the subtracter 50a subtracts the output signal c from the multiplier 50e from the output signal b from the first filtering circuit 40 and outputs the resultant signal d as shown in FIG. 9D to the multiplier 60.

The output signal d from the subtracter 50a is also applied to the adder 50b. The adder 50b adds the output signal d from the subtracter 50a and the output signal Y from the buffer 50d and outputs the resultant signal to the limiter 50c.

The limiter 50c limits the desired range of the output signal from the adder 50b and outputs the resultant signal to the buffer 50d. Then, the buffer 50d stores the output signal from the limiter 50c in response to the output signal a from the wave-shaping circuit 30 and outputs the stored signal to the adder 50b and the multiplier 50e.

As a result, the multiplier 50e multiplies the output signal Y from the buffer 50d by the desired number and outputs the resultant signal to the subtracter 50a.

Thereafter, the subtracter 50a, the adder 50b, the limiter 50c, the buffer 50d and the multiplier 50e perform repeatedly the above sequential operation.

Noticeably, the second filtering circuit 50 acts to attenuate the low-frequency gain of the output signal b from the first filtering circuit 40. In the signal transfer characteristic of the second filtering circuit 50, as shown in FIG. 8, a low-frequency gain of the output signal d is limited to 4dB.

Here, Z-transform values of the limiter 50c and the buffer 50d are $Z^{-1}$. As a result, a transfer function $T_f$ of the second filtering circuit 50 can be expressed by the following equation (2):

$$T_f=[1+\{(K \cdot Z^d \cdot Z^{-M})/(1-Z^{31\ M})\}] \cdot [(1-Z-1)/\{1-(1-Ke)\cdot Z^{-1}\}] \quad (2)$$

Then, upon receiving the output signal d from the subtracter 50a in the second filtering circuit 50, the multiplier 60 multiplies the received signal d by the desired number Ke and outputs the resultant signal to the speed/phase adder 90.

On the other hand, in the phase error detector 70, the frequency divider 70a frequency-divides the output signal a from the wave-shaping circuit 30 at the desired ratio and outputs the resultant signal cpr to the counter 70b. The counter 70b is reset in response to the output signal cpr from the frequency divider 70a, so as to count the clock signal CK2.

Upon receiving the vertical synchronous signal VS in the counting operation, the counter 70b outputs the phase error signal cpe to the third filtering circuit 80.

The third filtering circuit 80 filters the phase error signal cpe from the counter 70b in the phase error detector 70 at the desired frequency band in response to the vertical synchronous signal VS and outputs the resultant signal to the speed/phase adder 90.

Then, the speed/phase adder 90 adds a speed value or the output signal from the multiplier 60 and a phase value or the output signal from the third filtering circuit 80 and outputs the resultant value to the motor controller 100.

As seen from FIG. 10, a phase system gain PC or a gain of the output signal from the third filtering circuit 80 is not obtained as indicated by a conventional gain curve c' but as indicated by an ideal gain curve d'. Also, a cross point at 0dB rises from f1 to f2. The sum AFPC of the phase system gain and a speed system gain or the sum of the gain of the output signal from the third filtering circuit 80 and a gain of the output signal from the multiplier 60 is not obtained as indicated by a conventional gain curve b' but as indicated by an ideal gain curve a'.

Then in the motor controller 100, the fourth filtering circuit 100a filters the output signal from the speed/phase adder 90 at the desired frequency band in response to the output signal a from the wave-shaping circuit 30 and outputs the resultant digital signal to the digital/analog converter 100b. The digital/analog converter 100b converts the digital signal from the fourth filtering circuit 100a into the analog signal and outputs the converted analog signal to the motor driver 100c.

As a result, the motor driver 100c drives the servo motor 10 in response to the output signal from the digital/analog converter 100b.

As apparent from the above description, according to the present invention, the gain of the transfer signal of the torque ripple removing filter increased at the low-frequency region is attenuated by the low-frequency gain attenuation filter. Therefore, the servo motor control circuit of the present invention has the effect of removing the torque ripple component generated in the rotation of the servo motor and attenuating a phase distortion at the low frequency band.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed:

1. A servo motor control circuit for a video signal playback apparatus, comprising:

wave-shaping means for wave-shaping a pulse signal generated according to rotation of a servo motor and providing resultant first and second output signals, said first and second output signals having a desired phase difference therebetween;

speed error detection means for inputting the first and second output signals from said wave-shaping means as reset and enable signals, respectively, and counting an external clock signal in response to the inputted signals to output a speed error signal;

first filtering means for filtering a torque ripple component of the speed error signal from said speed error detection means in response to the second output signal from said wave-shaping means wherein a gain of said first filtering means is much higher in a low frequency band than in any other frequency band;

second filtering means for attenuating a low-frequency gain of an output signal from said first filtering means in response to the second output signal from said wave-shaping means;

phase error detection means for outputting a phase error signal in response to the second output signal from said wave shaping means and an external comparison signal;

speed/phase adding means for adding an output signal from said second filtering means and the phase error signal from said phase error detection means; and motor control means for controlling said servo motor in response to an output signal from said speed/phase adding means and the second output signal from said wave-shaping means.

2. A servo motor control circuit for a video signal playback apparatus, comprising:

wave-shaping means for wave-shaping a pulse signal generated according to rotation of a servo motor and providing the resultant first and second output signals, said first and second output signals having a desired phase difference therebetween;

speed error detection means for inputting the first and second output signals from said wave-shaping means as reset and enable signals, respectively, and counting an external clock signal in response to the inputted signals to output a speed error signal;

first filtering means for filtering a torque ripple component of the speed error signal from said speed error detection means in response to the second output signal from said wave-shaping means;

second filtering means for attenuating a low-frequency gain of an output signal from said first filtering means in response to the second output signal from said wave-shaping means wherein said second filtering means includes:

a subtracter for subtracting a first signal from the output signal from said first filtering means and outputting the resultant signal to a speed/phase adding means;

an adder for adding an output signal from said substracter and a second signal;

a limiter for limiting a desired range of an output signal from said adder;

a buffer for storing an output signal from said limiter in response to the second output signal from said wave-shaping means and outputting the stored signal as the second signal to the adder; and a multiplier for multiplying the second signal from said buffer by a desired number and outputting the resultant signal as the first signal to said subtracter;

phase error detection means for outputting a phase error signal in response to the second output signal from said wave shaping means and an external comparison signal;

speed/phase adding means for adding an output signal from said second filtering means and the phase error signal from said phase error detection means; and motor control means for controlling said servo motor in response to an output signal from said speed/phase adding means and the second output signal from said wave-shaping means.

* * * * *